US008626960B2

(12) United States Patent
Zhang et al.

(10) Patent No.: US 8,626,960 B2
(45) Date of Patent: Jan. 7, 2014

(54) INDUSTRIAL CONTROLLER INTERFACE FOR PLUG-IN I/O MODULES

(75) Inventors: Yue Zhang, Singapore (SG); Kevin Lee Huan Hong, Singapore (SG)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 38 days.

(21) Appl. No.: 13/281,247

(22) Filed: Oct. 25, 2011

(65) Prior Publication Data

US 2012/0110216 A1 May 3, 2012

(30) Foreign Application Priority Data

Oct. 29, 2010 (SG) ................................ 201007994-5

(51) Int. Cl.
*G06F 3/00* (2006.01)

(52) U.S. Cl.
USPC .......... 710/8; 710/2; 710/10; 710/14; 710/16; 710/17; 710/104; 710/300; 710/305; 700/19; 709/227; 709/228; 709/250

(58) Field of Classification Search
None
See application file for complete search history.

(56) References Cited

U.S. PATENT DOCUMENTS

| | | | |
|---|---|---|---|
| 4,809,217 A | 2/1989 | Floro et al. ....................... 710/52 |
| 5,472,347 A | 12/1995 | Nordenstrom et al. .......... 439/61 |
| 6,233,626 B1 * | 5/2001 | Swales et al. .................... 710/11 |
| 6,349,235 B1 | 2/2002 | Gibart et al. ..................... 700/11 |
| 6,484,215 B1 | 11/2002 | Gibart et al. ..................... 710/9 |
| 6,651,110 B1 | 11/2003 | Caspers et al. ................... 710/13 |
| 6,947,798 B2 | 9/2005 | Bronikowski et al. .......... 700/90 |
| 7,581,053 B2 | 8/2009 | Sichner et al. ................. 710/300 |
| 7,587,251 B2 | 9/2009 | Hopsecger ....................... 700/17 |
| 7,804,287 B2 | 9/2010 | Terdan et al. ................. 323/351 |
| 2003/0074489 A1 * | 4/2003 | Steger et al. ...................... 710/1 |
| 2006/0121770 A1 * | 6/2006 | Hammer et al. .............. 439/374 |
| 2008/0005406 A1 * | 1/2008 | Odom et al. ..................... 710/58 |
| 2009/0077270 A1 * | 3/2009 | Chen et al. ........................ 710/2 |
| 2010/0204806 A1 * | 8/2010 | Chowaniec et al. ............ 700/19 |

OTHER PUBLICATIONS

'Modular I/O System—MODBUS Manual, Technical Description, Installation and Configuration' by WAGO, copyright 1997-2001.*
'Evaluation of a fast PLC module in prospect of the LHC beam interlock system' by Manuel Zaera Sanz, Feb. 2005.*
'Electronics Manual for Valve Terminal Type 03/04-B' from FESTO, copyright 2000.*
'IEEE 1451: A Standard in Support of Smart Transducer Networking' by Kang Lee, copyright 2000, IEEE.*

* cited by examiner

*Primary Examiner* — Steven Snyder
(74) *Attorney, Agent, or Firm* — Fletcher Yoder, P.C.; R. Scott Speroff; John M. Miller

(57) ABSTRACT

An interface for an industrial controller is provided that enables connection of different types of plug-in I/O modules to the industrial controller. The interface includes several mechanisms, which can be implemented through control logic, circuitry, and/or software, that enable the control/monitoring device to operate in conjunction with different types of plug-in I/O modules. According to certain embodiments, the interface includes setup mechanisms that enable initial communications between the plug-in I/O modules and the control/monitoring device. The interface also may include operational mechanisms that facilitate communication between the plug-in I/O modules and the control/monitoring device during operation. The interface further may include registers that store data for the plug-in I/O modules.

20 Claims, 4 Drawing Sheets

| ADDRESS OF REGISTER (42) | DESCRIPTION | DATA (52, 56) |
| --- | --- | --- |
| 0000 | MODULE PHYSICAL ID LOW BYTE VALUE | IDENTIFICATION DATA (60) |
| 0001 | MODULE PHYSICAL ID HIGH BYTE VALUE | IDENTIFICATION DATA (60) |
| 0002 | MODULE VENDOR SPECIFIC ID LOW BYTE VALUE | IDENTIFICATION DATA (60) |
| 0003 | MODULE VENDOR SPECIFIC ID HIGH BYTE VALUE | IDENTIFICATION DATA (60) |
| 0004 | MODULE PRODUCT TYPE LOW BYTE VALUE | IDENTIFICATION DATA (60) |
| 0005 | MODULE PRODUCT TYPE HIGH BYTE VALUE | IDENTIFICATION DATA (60) |
| 0006 | MODULE PRODUCT ID LOW BYTE VALUE | IDENTIFICATION DATA (60) |
| 0007 | MODULE PRODUCT ID HIGH BYTE VALUE | IDENTIFICATION DATA (60) |
| 0008 | MODULE REVISION ID LOW BYTE VALUE | IDENTIFICATION DATA (60) |
| 0009 | MODULE REVISION ID HIGH BYTE VALUE | IDENTIFICATION DATA (60) |
| 000A | MODULE INTERRUPT STATUS | INTERRUPT DATA (90) |
| 000B | CONTROLLER OPERATION STATUS INFORMATION | CONTROLLER MODE DATA (82) |
| 000C | NUMBER OF INPUT CHANNEL | I/O FORMAT DATA (70) |
| 000D | NUMBER OF OUTPUT CHANNEL | I/O FORMAT DATA (70) |
| 000E | STARTING ADDRESS OFFSET OF GENERIC CONFIGURATION DATA | CONFIGURATION FORMAT DATA (64) |
| 000F | MODULE FEATURE REGISTER | FEATURE DATA (74) |
| 0010 | MODULE STATUS REGISTER | MODULE MODE DATA (94) |
| 0011 | MODULE MODE CONTROL REGISTER | MODULE CONTROL DATA (86) |
| 0018 | STARTING ADDRESS OFFSET OF INPUT REGISTERS | I/O FORMAT DATA (70) |
| 0019 | STARTING ADDRESS OFFSET OF OUTPUT REGISTERS | I/O FORMAT DATA (70) |
| 001A | WRITING TO THIS REGISTER TRIGGERS INPUT LATCH | FEATURE DATA (74) |
| 001B | WRITING TO THIS REGISTER TRIGGERS OUTPUT APPLY | FEATURE DATA (74) |
| 001C | WRITING TO THIS REGISTER ENABLES/DISABLES MODULE INTERRUPT | FEATURE DATA (74) |
| 001D | LOW BYTE OF THE GENERIC CONFIGURATION DATA LENGTH | CONFIGURATION FORMAT DATA (64) |
| 001E | HIGH BYTE OF THE GENERIC CONFIGURATION DATA LENGTH | CONFIGURATION FORMAT DATA (64) |
| DEFINED | INPUT DATA FROM INPUT CHANNEL | INPUT DATA (76) |
| DEFINED | OUTPUT DATA TO OUTPUT CHANNEL | OUTPUT DATA (78) |
| DEFINED | GENERIC CONFIGURATION DATA | MODULE CONFIGURATION DATA (66) |

FIG. 4

INDUSTRIAL CONTROLLER INTERFACE FOR PLUG-IN I/O MODULES

CROSS REFERENCE TO RELATED APPLICATIONS

This application claims priority from and the benefit of Singapore Application No. 201007994-5, filed on Oct. 29, 2010 entitled "Industrial Controller Interface for Plug-In I/O Modules", which is herein incorporated by reference.

BACKGROUND

The invention relates generally to the field of industrial automation and control systems, such as those used in industrial and commercial settings. More particularly, embodiments of the present invention relate to industrial controller drivers designed to interface with different types of plug-in I/O modules.

Industrial controllers are special purpose computers used for controlling factory automation and the like. Under the direction of stored programs, a processor of the industrial controller examines a series of inputs reflecting the status of a controlled process and changes outputs affecting control of the controlled process. The stored control programs can be continuously executed in a series of execution cycles, executed periodically, or executed based on events.

The inputs received by the industrial controller from the controlled process and the outputs transmitted by the industrial controller to the controlled process are normally passed through one or more input/output (I/O) modules, which serve as an electrical interface between the controller and the controlled process. The inputs and outputs are recorded in an I/O data table in memory. Input values may be asynchronously read from the controlled process by specialized circuitry. Output values are written directly to the I/O data table by the processor and then communicated to the controlled process by the specialized communications circuitry.

Some industrial controllers may provide for connection of additional I/O modules, such as plug-in I/O modules, to add input and output functionality to the controller. For example, adding an I/O module may allow the industrial controller to interface with a specific type of control equipment. Further, the plug-in I/O modules may provide different functionalities, such as added analog inputs and/or outputs, digital inputs and/or outputs, temperature control and/or monitoring, and voltage control and/or monitoring, among others. Accordingly, the plug-in I/O modules can have different hardware structures that may require custom drivers and other custom software to allow their use with the industrial controller. For example, the plug-in I/O modules may have different types and/or numbers of inputs and outputs. Providing custom drivers typically requires on-site firmware upgrades and testing. It is now recognized that this adds complexity, cost, and development time. Further, providing custom software can involve the use of extensive software libraries, which may result in slower I/O scanning during operation of the industrial controller.

BRIEF DESCRIPTION

The present invention provides a novel approach to connecting and using plug-in I/O modules with an industrial controller, such as a control/monitoring device for controlling or monitoring an industrial process. In particular, the present invention provides an interface, such as a common driver, for a control/monitoring device that enables connection of the control/monitoring device to different types of plug-in modules. The interface includes several mechanisms, which can be implemented through control logic, circuitry, and/or software, that enable the control/monitoring device to operate in conjunction with different types of plug-in I/O modules.

According to certain embodiments, the interface includes setup mechanisms that enable initial communications between the plug-in I/O modules and the control/monitoring device. For example, the setup mechanisms may detect connection of a plug-in I/O module, request identification data from a connected plug-in I/O module, write module configuration data to a connected plug-in I/O module, and retrieve I/O data and feature data from a connected I/O module. The interface also may include operational mechanisms that facilitate communication between the plug-in I/O modules and the control/monitoring device during operation. For example, the operational mechanisms may communicate operational mode data between the control/monitoring device and a connected plug-in I/O module and may enable the connected plug-in I/O module to interrupt operation of the control/monitoring device. The interface further may include registers that store data for the plug-in I/O modules.

DRAWINGS

These and other features, aspects, and advantages of the present invention will become better understood when the following detailed description is read with reference to the accompanying drawings in which like characters represent like parts throughout the drawings, wherein:

FIG. 4 is a table depicting an embodiment of register addresses for the interface of FIG. 3 in accordance with the present techniques.

DETAILED DESCRIPTION

Figure 1:
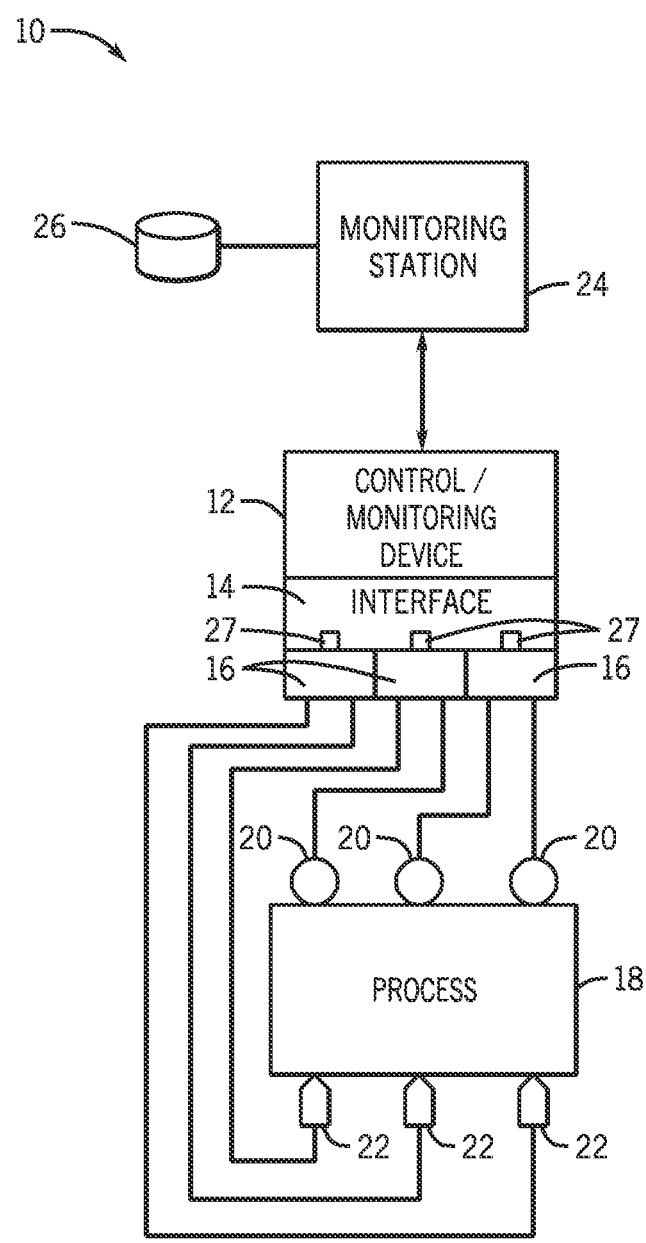
FIG. 1 is a diagrammatical representation of an exemplary control and monitoring system that includes a control/monitoring device that is compatible with different types of plug-in I/O modules in accordance with the present techniques.

FIG. 1 is a diagrammatical representation of an exemplary control and monitoring system 10 that employs a control/monitoring device 12 that includes a common interface 14 designed to support various types of plug-in I/O modules 16. The plug-in I/O modules 16 may be produced by the manufacturer of the control/monitoring device 12 or may be prepared by third party providers. The control and monitoring system 10 includes a process 18 that can be controlled and/or monitored by the control/monitoring device 12. The process 18 may take many forms and may include devices for accomplishing many different and varied purposes. For example, the process may comprise a compressor station, an oil refinery, a batch operation for making food items, a mechanized assembly line, and so forth. Accordingly, the process 18 may include a variety of operational components, such as electric motors, valves, actuators, temperature elements, pressure sensors, for a myriad of manufacturing, processing, and/or material handling applications, among others. According to certain embodiments, the control and/or monitoring of the process 18 may be facilitated by the use of certain network strategies. For example, an industry standard network may be employed, such as DeviceNet, to enable data transfer. The networks can permit the exchange of data in accordance with a predefined protocol, and may provide power for operation of networked elements.

Further, the process 18 may comprise control and monitoring equipment for regulating process variables through automation and/or observation. For example, the illustrated process 18 includes sensors 20 and actuators 22. The sensors 20 can include any number of devices adapted to provide information regarding process conditions. The actuators 22 can include any number of devices adapted to perform a mechanical action in response to an input signal.

As illustrated, the sensors 20 and the actuators 22 are in communication with the control/monitoring device 12 to control and/or monitor equipment within the process 18. For example, the sensors 20 and the actuators 22 can be utilized within process loops that are monitored and controlled by the control/monitoring device 12 and/or by a monitoring station 24. According to certain embodiments, the monitoring station 24 may include one or more personal computers and/or displays that enable a user to view the status of the control/monitoring device 12, program certain components of the control/monitoring device 12, and/or adjust operating parameters of the process 18 and/or the control/monitoring device 12. For example, the monitoring station 24 may display output parameters such as operating parameters of the process 18, temperatures and pressures sensed by the sensors 20, position information of the actuators 22, and so forth. Further, the monitoring station 24 may be connected to a database 26 (for example, over a network) that provides data for the plug-in I/O modules 16. In other embodiments, the database 26 may be stored within the monitoring station 24.

In certain embodiments, a process loop may be activated based on process inputs (e.g., input from a sensor 20) or by direct operator input received through the monitoring station 24. The sensors 20 and the actuators 22 can be assigned a particular address in the control/monitoring device 12 that is accessible by the monitoring station 24. According to certain embodiments, the sensors 20 and the actuators 22 communicate with the control/monitoring device 12 via one or more of the plug-in I/O modules 16 coupled to the control/monitoring device 12. The plug-in I/O modules 16 may transfer input and output signals between the control/monitoring device 12 and the controlled process 18.

According to certain embodiments, the control/monitoring device 12 may be an industrial controller, such as a programmable logic controller and/or an automation controller. The plug-in I/O modules 16 can be added to or removed from the control/monitoring device 12 via connection ports 27 of the interface 14. For example, to add functionality to the control/monitoring device 12, additional plug-in I/O modules 16 may be added. For example, when new sensors 20 or actuators 22 are added to control the process 18, additional plug-in I/O modules 16 may be added to the control/monitoring device 12 by coupling the additional plug-in I/O modules 16 to the connection ports 27. According to certain embodiments, the connection ports 27 may be disposed in expansions slots or bays of the control/monitoring device 12 and may include a connector, such as a male or female pin connector, for mating with a corresponding connector of the plug-in I/O modules 16.

The plug-in I/O modules 16 can enable the control/monitoring device 12 to perform a variety of different functions. For example, the plug-in I/O modules 16 may include communication modules, such as an isolated RS232/RS485 module or a DeviceNet module, that allow the control/monitoring device 12 to communicate with industry standard networks. According to certain embodiments, the plug-in I/O modules 16 may include input modules that receive signals from input devices, such as photo-sensors, proximity switches, and temperature sensors (e.g. thermocouples and/or resistance temperature detectors), output modules that use output signals to energize relays or to start motors, and/or bidirectional I/O modules, such as motion control modules, which can direct motion devices and receive position or speed feedback. In some embodiments, the plug-in I/O modules 16 may convert between AC and DC analog signals used by devices of the process 18 and +5-volt DC logic signals used by the control/monitoring device 12. Further, some of the plug-in I/O modules 16 may provide digital signals to digital I/O devices and receive digital signals from digital I/O devices.

As described further below with respect to FIG. 2, the plug-in I/O modules 16 can be designed to meet standards that ensure compatibility with the interface 14. According to certain embodiments, the common interface 14 includes one or more drivers designed to control operation of each of the different types of plug-in I/O modules 16 that comply with the common interface standard. Accordingly, the common interface 14 enables the control/monitoring device 12 to function with the different types of plug-in I/O modules without requiring a firmware upgrade or an extensive software library.

Figure 2:
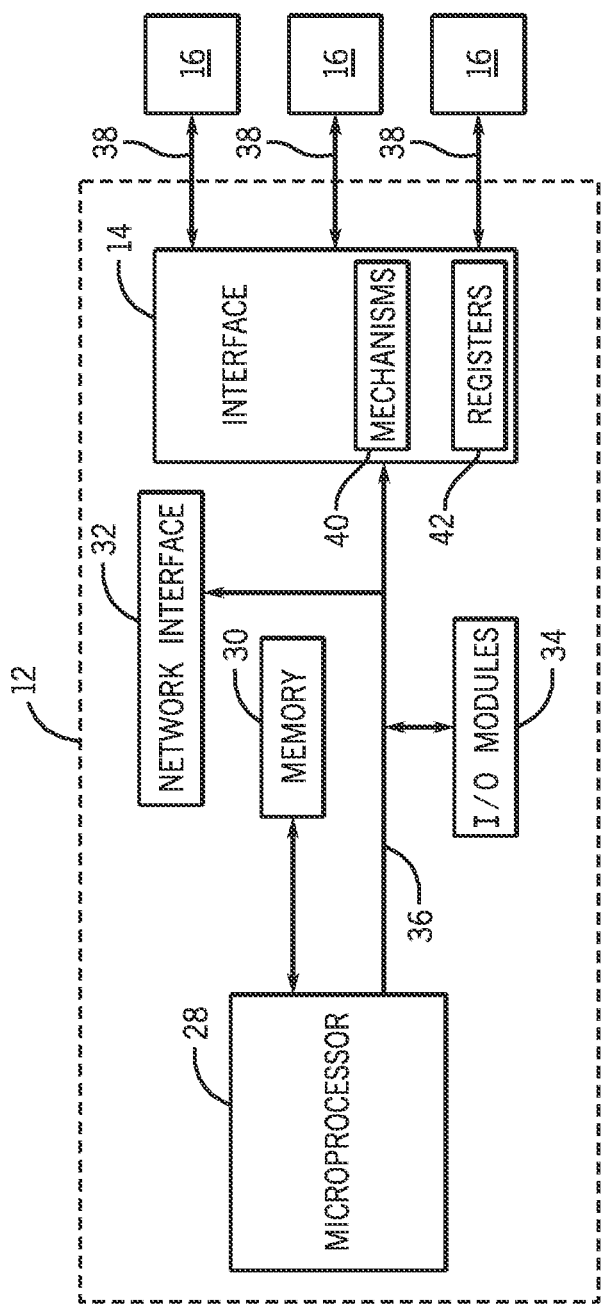
FIG. 2 is a block diagram illustrating components of the control/monitoring device of FIG. 1 in accordance with the present techniques.

FIG. 2 is a block diagram illustrating an example of components of the control/monitoring device 12. The control/monitoring device 12 includes a microprocessor 28 that may read and write to a memory 30. The memory 30 holds programs executed by the microprocessor 28 to provide desired functions and also variables and data necessary for the execution of those programs. The control/monitoring device 12 also includes a network interface 32 to provide for communication over the networks described above with respect to FIG. 1. Further, the control/monitoring device 12 includes one or more embedded I/O modules 34 that are integrated into the control/monitoring device 12. The embedded I/O module 34 serves as an electrical interface between the control/monitoring device 12 and components of the process 18 and provides functionality similar to the plug-in I/O modules 16. However, the embedded I/O module 34 is integrated into the control/monitoring device 12, rather than existing as removable components like the plug-in I/O modules 16. I/O data can be transferred between the embedded I/O module 34 and the microprocessor 28 over one or more data buses 36 included within the control/monitoring device 12.

The interface 14 also is communicatively coupled to the microprocessor 28 through the one or more data buses 36. Further, the interface 14 can be communicatively coupled to the plug-in I/O modules 16 through a connection 38. According to certain embodiments, the connection 38 may be established by connecting a physical connector of the plug-in I/O module 16 to a corresponding port of the interface 14, such as the connection port 27 (FIG. 1).

According to certain embodiments, the connection 38 may include a 40-pin hardware connection interface that employs a Synchronous Parallel Interface (SPI) for the primary exchange of data between the plug-in I/O module 16 and the interface 14. For example, signals, such as address, data, read, write, chip select, interrupt, and parity signals, may be exchanged over the SPI. In certain embodiments, the SPI may include an 8-bit parallel data bus and an 11-bit address bus. Further, the connection 38 may support up to 2 kilobytes of addressing capability. The connection 38 also may provide for the supply of power from the control/monitoring device 12 to the plug-in module 16. For example, in certain embodiments, the connection 38 may provide a 3.3 volt and a 24 volt power supply to the plug-in module 16. According to certain embodiments, the plug-in modules 16 may be powered solely by the control/monitoring device 12 and may not include a separate power supply.

As described above with respect to FIG. 1, the interface 14 can include one or more mechanisms 40 that allow the control/monitoring device 12 to interface with different types of plug-in I/O modules 16. The mechanisms 40 may include control logic, circuitry, and/or software. According to certain embodiments, the mechanisms 40 may include one or more firmware drivers. According to certain embodiments, the mechanisms 40 may be embodied on a non-transitory machine readable medium, such as read only memory, flash memory, a hard drive, or any other suitable optical, magnetic, or solid-state computer readable media, as well as a combination thereof.

As described further below with respect to FIG. 3, the mechanisms 40 may allow for the exchange of data between one or more plug-in I/O modules 16 and the control/monitoring device 12. For example, the mechanisms 40 may be designed to retrieve setup data, such as the number of inputs and outputs on the plug-in I/O module 16, the data length used by the plug-in I/O module, and the type of the plug-in I/O module 16, among others, and may be designed to store the setup data in registers 42 of the interface 14. The mechanisms 40 also may be designed to exchange operational data, such as the status of the control/monitoring device 12 and the status of the plug-in I/O module 16, among others, during operation of the control/monitoring device 12. The operational data also may be stored within the registers 42. According to certain embodiments, the registers 42 may include address registers, storage registers, and/or general purpose registers. Further, in certain embodiments, the plug-in I/O modules 16 may be designed to support primary registers of the interface 14.

Figure 3:
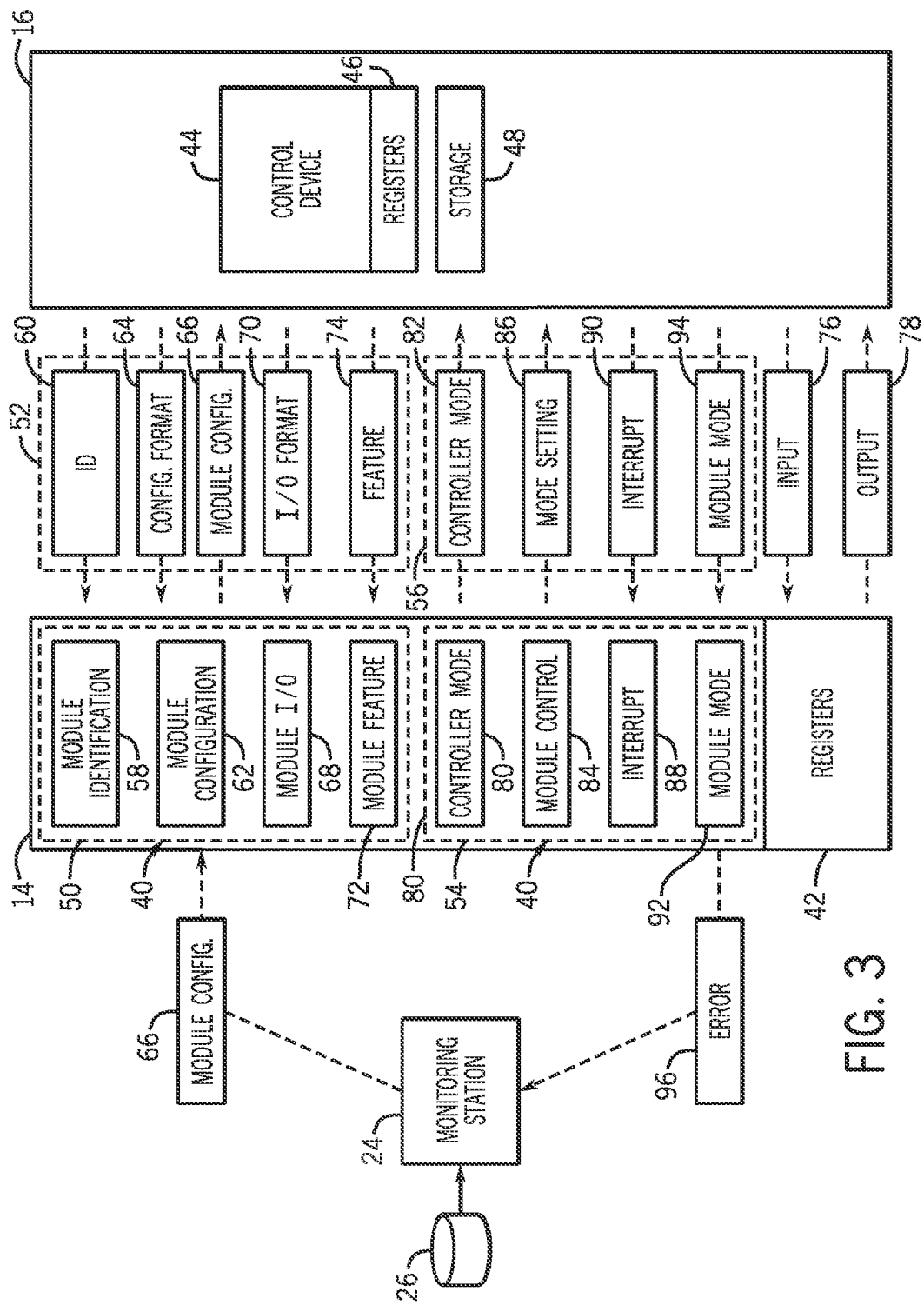
FIG. 3 is a diagrammatical representation of an interface of the control/monitoring device of FIG. 2 in communication with a plug-in I/O module in accordance with the present techniques.

FIG. 3 is a diagrammatical representation depicting communication between the interface 14 and a plug-in I/O module 16. Although one plug-in I/O module 16 is depicted in FIG. 3, the interface 14 may communicate with any number of plug-in I/O modules 16. For clarity, only the interface 14 of the control/monitoring device 12 is shown in FIG. 3; however, it should be understand that the interface 14 operates in conjunction with the other components of the control/monitoring device 12, as discussed above with respect to FIG. 2.

The plug-in I/O module 16 includes a control device 44 that governs operation of the plug-in I/O module 16. For example, as shown in FIG. 1, the control device 44 may enable the plug-in I/O module 16 to control inputs from sensors 20 and/or outputs to actuators 22 of the process 18. According to certain embodiments, the control device 44 may be a complex programmable logic device (CPLD) and/or a microprocessor. The control device 44 can be designed to meet standards that comply with the common interface 14, thereby making the control device 44 and the plug-in I/O module 16 compatible with the interface 14.

The control device 44 also includes registers 46 that provide temporary storage areas for instructions and/or data. According to certain embodiments, the registers 46 may include one or more address registers, storage registers, general purpose registers, accumulators, or a combination thereof. According to certain embodiments, the registers 46 may be designed to store input and output data for interacting with the process 18. The plug-in I/O module 16 further includes storage 48, such as an EPROM, that provides for non-volatile storage of data. For example, data may be stored within the storage 48 that can be used by the interface 14 to establish communication between the interface 14 and the plug-in module 16. In certain embodiments, the storage 48 may be integrated within the control device 44. However, in other embodiments, the storage 48 may be a separate component from the control device 44.

Communication between the interface 14 and the plug-in I/O module 16 may begin upon power up of the control/monitoring device 12. As described above with respect to FIG. 2, communication may occur through the connection 38. The mechanisms 40 may initiate communication with the plug-in I/O module 16, thereby allowing the plug-in I/O module 16 to function as a slave device. The mechanisms 40 include setup mechanisms 50 that exchange setup data 52 with the plug-in I/O module 16 and operational control mechanisms 54 that exchange operational data 56 with the plug-in I/O module 16. The setup data 52 and the operational data 56 can be stored in designated registers 42 of the interface 14. For example, each of the mechanisms 40 may interact with one or more designated registers 42 that store the data used by that mechanism 40. The mechanisms 40, the microprocessor 28 (FIG. 2), and the plug-in I/O module 16 may employ the data stored within the registers 42 to conduct operations of the control/monitoring device 12.

FIG. 4 depicts a table of representative registers 42 that may be designated to receive data for individual mechanisms 40. Each of the registers is identified by an address and stores the data 52 and/or the data 56 employed by the mechanisms 40. The data 52 and the data 56 may be stored within one or more bits of the registers 42. As may be appreciated, FIG. 4 is provided by way of example only and is not intended to be limiting. In other embodiments, the specific register addresses and/or the number of register addresses employed may vary depending on factors, such as the types of plug-in I/O modules 16 designed to interact with the interface 14 and/or the specific design of the control/monitoring device 12.

Returning to FIG. 3, a module identification mechanism 58 may poll the plug-in I/O module 16 to retrieve identification data 60 upon power up of the control/monitoring device 12. According to certain embodiments, the identification data 60 may be stored within the storage 48 and may include identification information, such as the vendor identification number (e.g. a number that identifies the manufacturer of the module), the module version number, the module serial number, the module type (e.g. whether the plug-in module 16 is a discrete I/O module or a multichannel analog module, among others) and/or the vendor specific product code for the plug-in I/O module 16. The module identification mechanism 58 may then store the identification data 60 in designated registers 42 of the interface 14. For example, as shown in FIG. 4, the identification data 60 may be stored within registers 0000 to 0009. In certain embodiments, the identification data 60 may include high byte and low byte values. If no identification data 60 is received, the interface 14 may assume that no plug-in I/O module 16 is coupled to the interface 14.

After the identification data 60 has been retrieved by the module identification mechanism 58, a module configuration mechanism 62 may retrieve configuration format data 64 from the plug-in I/O module 16. According to certain embodiments, the configuration format data 64 may be stored within the storage 48. The configuration format data 64 may include data that identifies the format of data used by the plug-in I/O module 16. For example, the configuration format data 64 may identify the data length employed by the plug-in I/O module 16. In certain embodiments, the data length may be represented by high byte and low byte values. Further, the configuration format data 64 may include an offset number for identifying the starting address for where configuration data should be stored with the plug-in I/O module 16. According to certain embodiments, the offset number may represent the amount of offset from the base address of the plug-in I/O module. After retrieving the configuration format data 64, the module configuration mechanism 62 may store the configuration format data 64 within the registers 42. For example, as shown in FIG. 4, the configuration format data 64 may be stored within registers 000E, 001D, and 001E.

The module configuration mechanism 62 may use the configuration format data 64 to retrieve module configuration data 66 for the plug-in I/O module 16. According to certain embodiments, the module configuration mechanism 62 may retrieve the module configuration data 66 from the monitoring station 24. For example, the module configuration mechanism 62 may communicate with the microprocessor 28, which may then request the module configuration data 66 through the network interface 32, as shown in FIG. 2. According to certain embodiments, the monitoring station 24 may retrieve the module configuration data 66 from the database 26. Further, in certain embodiments, the module configuration mechanism 62 also may use the identification data 60 to retrieve the module configuration data 66. The module configuration data 66 may define operational parameters that the plug-in module 16 should employ, such as the current output level and/or the voltage mode among others.

The module configuration mechanism 62 may store some or all of the module configuration data 66 within the registers 42. In certain embodiments, the module configuration mechanism 62 may use the configuration format data 64 to define one or more registers 42 that should store the configuration data 66. For example, the module configuration mechanism 62 may use the offset number received as part of the configuration format data 64 to assign registers 42 that should store the configuration data 66. The module configuration mechanism 62 also may write the module configuration data 66 to the control device 44 of the plug-in I/O module 16. The control device 44 may then store the module configuration data 66 within the registers 46. Retrieval and writing of the module configuration data 66 may occur upon power up of the control/monitoring device 12 and may be particularly useful when the plug-in I/O module 16 does not include its own power supply, such as a battery, that could be used to retain data when the control/monitoring device 12 is powered down.

The interface 14 may then determine input/output (I/O) information for the plug-in I/O module 16 through a module I/O mechanism 68. For example, the module I/O mechanism 68 may request I/O format data 70 from the plug-in I/O module 16. According to certain embodiments, the I/O format data 70 may be stored within the storage 48. The I/O format data 70 may represent the I/O configuration of the plug-in I/O module 16. For example, the I/O format data 70 may identify the number of inputs and/or the number of outputs included in the plug-in I/O module 16.

The I/O format data 70 also may identify the starting address offset number for the input registers and/or the output registers. For example, the offset number may identify the offset from the base address of the plug-in I/O module 16 of where the input data and/or the output data should be stored within the registers 46. The offset number may enable the interface 14 to retrieve the input data from and transmit the output data to the appropriate registers 46 of the plug-in I/O module 16. The module I/O mechanism 68 may then store the I/O format data 70 within the registers 42. For example, as shown in FIG. 4, the I/O format data 70 may be stored within registers 000C, 000D, 0018, and 0019. Further, the module I/O mechanism 68 may use the I/O format data 70 to define input and output registers 42 of the interface 14. For example, the module I/O mechanism 68 may define addresses of the registers 48 using the staring address offsets stored within addresses 0018 and 0019 to define registers 42 that correspond to the registers 46 employed by the control device 44.

The interface 14 also includes a module feature mechanism 72 that requests feature data 74 from the plug-in I/O module 16. For example, the feature data 74 may define features that are included in the plug-in I/O module 16, such as whether user interrupt functionality exists, whether an input latch mechanism exists, and/or whether an output apply mechanism exists. When user interrupt functionality is included within the plug-in I/O module 16, a user may be able to program the plug-in I/O module 16 to interrupt the control/monitoring device 12 when a specific input event (e.g. a sensed value of temperature, voltage, etc. received through a sensor 20) occurs. If a user has programmed a user interrupt event, the feature data 74 may include data describing the input event, and the interface 14 may write data to a register to indicate that a user interrupt event has been programmed. For example, the interface 14 may write the feature data to 74 register 001C as shown in FIG. 4. The input latch mechanism and the output apply mechanism may be designed to ensure data integrity for communication of two byte data and may be employed to synchronize inputs and outputs of the plug-in I/O module 16.

The module feature mechanism 72 may then store the feature data 74 within the registers 42. For example, the module feature data 74 may be stored within register 000F as shown in FIG. 4. According to certain embodiments, different bits within register 000F may represent different features of the plug-in I/O module 16. For example, one bit may be used to indicate whether the user interrupt functionality exists, while another bit may be used to indicate whether an input latch mechanism exists and yet another bit may be used to indicate whether an output apply mechanism exists.

The module feature mechanism 72 also may store data within certain registers 42 to indicate how data should be communicated based on the features that are present within the plug-in I/O module 16. Writing to certain registers by the module feature mechanism 72 may identify whether the features represented by the featured data 74 are present within the plug-in I/O module 16. For example, as shown in FIG. 4, writing the feature data 74 to register 001A may indicate that input latching should be employed. Similarly, writing to the register 001B may indicate that output latching should be employed. In certain embodiments, if no feature data 74 is written to these registers, these registers may be ignored.

The module identification mechanism 50, the module configuration mechanism 62, the module I/O mechanism 68, and the module feature mechanism 72 may operate simultaneously with one another or in various orders to obtain the setup data 52. Once the setup mechanisms 50 have completed the setup process, the interface 14 can facilitate operation of the plug-in I/O module 16 to control and/or monitor the process 18 (FIG. 1). During operation, the interface 14 may receive input data 76 from the plug-in I/O module 16 and may provide output data 78 to the plug-in I/O module 16. The input data 76 may be received by the control device 44 from inputs, such as the sensors 20, and may be provided to the interface 14 for use by the control/monitoring device 12. The output data 78 may be transmitted to the interface 14 by the microprocessor 28 for transmission to the plug-in I/O module 16 where the output data 78 may be employed by the control device 44 to control outputs, such as outputs to the actuators 22. The input data 76 and the output data 78 may be stored in the interface 14 within the input and output registers 42 defined by the module I/O mechanism 68 based on the offset numbers received from the plug-in I/O module 16 as part of the I/O format data 70. The control/monitoring device 12 may use the input data 76 and the output data 78 to control the process 18, as described above with respect to FIG. 1.

During operation of the control/monitoring device 12, operational control mechanisms 54 may facilitate the exchange of operational data 56 between the plug-in I/O module 16 and the interface 14. For example, the operational control mechanisms 54 may enable the control/monitoring device 12 and the plug-in I/O module to know the operational modes of each other. According to certain embodiments, the interface 14 may continuously write and/or request the operational data 56 to and/or from the control device 44 of the plug-in I/O module 16.

The interface 14 includes a controller mode mechanism 80 that may be employed to communicate controller mode data 82 to the plug-in I/O module 16. The controller mode data 82 may represent the operational mode of the control/monitoring device 12. For example, the controller mode data may indicate whether an error has occurred and if so, whether the error is an operational error or a fatal error. The controller mode mechanism 80 may retrieve the controller mode data 82 from the registers 42 and may transmit the controller mode data 82 to the control device 44. For example, as shown in FIG. 4, the controller mode mechanism 80 may retrieve the controller mode data 82 from register 000B. According to certain embodiments, different bits within the controller mode register 000B may represent whether an error has occurred and the type of error. Further, other bits within the controller mode register may represent the operational mode of the control/monitoring device 12. For example, one bit may be used for a non-run mode where the control/monitoring device is not providing output, and another bit may be used to represent a run mode.

Further, the controller mode data 82 also may represent the power status of the control/monitoring device 12. For example, one bit within the register 000B may represent that the power level is acceptable, while another bit may represent that a power failure has been triggered. According to certain embodiments, the control device 44 may initiate a data retention process upon receiving controller mode data 82 that indicates that a power failure has been triggered. For example, in certain embodiments, the control device 44 may send data from the registers 46 to the interface 14 for storage within the control/monitoring device 12 upon receiving an indication that a power failure has been triggered.

The interface also includes a module control mechanism 84 that may be employed to control the operational mode of the plug-in I/O module 16. In particular, the module control mechanism 84 may write module setting data 86 to the registers 46 of the plug-in I/O module 16 to place the plug-in I/O module 16 in a run mode or in a non-run mode. According to certain embodiments, the module control mechanism 84 may retrieve the module setting data 86 from the registers 42. For example, as shown in FIG. 4, the module control mechanism 84 may retrieve the module setting data 86 from register 0011. According to certain embodiments, the microprocessor 28 may write the module setting data 86 to the register 0011 when the microprocessor 28 (FIG. 2) desires to place the plug-in I/O module 16 in either the run mode or the non run mode.

The interface 14 further includes an interrupt mechanism 88 that enables the plug-in I/O module 16 to interrupt operation of the control/monitoring device 12. According to certain embodiments, the control device 44 of the plug-in I/O module 16 may generate an interrupt signal that transmits the interrupt data 90 to the interface 14 when an error occurs. According to certain embodiments, the interrupt data 90 may be transmitted in response to the control device 44 detecting a bus parity check failure or a module specific interrupt. For example, according to certain embodiments, the control device 44 may be programmed to generate interrupt signals based on the inputs from the sensors 20 of the process 18. Further, in certain embodiments, the control device may generate an interrupt signal based on a user defined interrupt event that may be programmed by a user through, for example, the monitoring station 24. For example, the user defined interrupt signal may exist when the plug-in I/O module 16 includes the user interrupt functionality, as stored within address 001C (FIG. 4).

According to certain embodiments, the interrupt data 90 may be placed within one of the registers 42 by the interrupt mechanism 88. For example, as shown in FIG. 4, the interrupt data 90 may be written to the register 000A. According to certain embodiments, different bits within this register may be used to identify the type of interrupt signal, for example, whether the interrupt is the result of a bus parity check failure, a module specific interrupt, or a user configured interrupt. The microprocessor 28 (FIG. 2) may then read the interrupt signal from the register 42 and may interrupt operation of the control/monitoring device 12. According to certain embodiments, the interface 14 may set the value of the interrupt register 000A to zero after the interrupt data 90 has been read by the microprocessor 28.

The interface 14 further includes a module mode mechanism 92 that periodically polls the plug-in I/O module 16 for module mode data 94. The module mode data 94 may represent the operational mode of the plug-in I/O module 16. For example, the module mode data 94 may indicate that the plug-in I/O module is idle, running, has received an error, or is busy. The module mode data 94 also may indicate whether the user interrupt functionality has been enabled or disabled on the plug-in I/O module 16. Further, module mode data 94 may include error data 96 that indicates specific errors that have occurred within the plug-in I/O module 16.

The module mode mechanism 92 may retrieve the module mode data 94 and may write the module mode data 94 to a designated register 42. For example, as shown in FIG. 4, the module mode mechanism 92 may write the module mode data to the register 0010. According to certain embodiments, different bits within the register 0010 may be employed to represent the module operational mode, the user interrupt status, and the error codes. The microprocessor 28 may use the module mode data 94 to control operation of the control/monitoring device 12. Further, in certain embodiments, the module mode mechanism 92 may transmit the error data 96, which is part of the module mode data 94, to the monitoring station 24. The monitoring station 24 may then display an error code representative of the error data 96 on a display accessible by a user, thereby allowing the user to address the error.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An industrial automation device, comprising:
   a port configured to receive a plurality of different types of plug-in input/output (I/O) modules; and
   an interface for enabling communication between the industrial automation device and the plurality of different types of plug-in I/O modules, wherein the interface comprises:

one or more setup mechanisms configured to detect connection of one of the plurality of different types of plug-in I/O modules to the interface through the port, configured to write module configuration data to the connected plug-in I/O module, and configured to retrieve I/O format data and feature data from the connected plug-in I/O module; and one or more operational mechanisms configured to exchange operational mode data between a control/monitoring device and the connected plug-in I/O module, wherein the one or more operational mechanisms comprise a controller mode mechanism configured to:

write controller mode data to designated registers of the interface, wherein the controller mode data comprises error data associated with the control/monitoring device, power data associated with the control/monitoring device, or a combination thereof; and transmit the controller mode data to the connected plug-in I/O module.

2. The industrial automation device of claim 1, wherein the one or more setup mechanisms comprise a module I/O mechanism configured to request the I/O format data from the connected plug-in I/O module and configured to store the I/O format data in designated registers of the interface, wherein the I/O format data comprises a number of inputs and a number of outputs for the connected plug-in I/O module.

3. The industrial automation device of claim 2, wherein the I/O data comprises a first offset value determinative of a first address of the connected plug-in I/O module where input data is stored and a second offset value determinative of a second address of the connected plug-in I/O module where output data is stored.

4. The industrial automation device of claim 1, wherein the one or more setup mechanisms comprise a module feature mechanism configured to request the feature data from the connected plug-in I/O module and to store the feature data in designated registers of the interface, wherein the feature data comprises input latch mechanism data, output latch mechanism data, or user interrupt functionality data, or a combination thereof.

5. The industrial automation device of claim 1, wherein the one or more setup mechanisms comprise a module configuration mechanism configured to request format data from the connected plug-in I/O module and configured to retrieve the module configuration data for the plug-in I/O module based on the format data.

6. The industrial automation device of claim 5, wherein the format data comprises data length information for the connected plug-in I/O module and offset data identifying a configuration data address of the connected plug-in I/O module.

7. The industrial automation device of claim 1, comprising the control/monitoring device configured to communicate with the interface, wherein the controller mode data comprises run data indicating whether the control/monitoring device is providing an output.

8. The industrial automation device of claim 1, wherein the one or more operational mechanisms comprise a module control mechanism configured to set the connected plug-in I/O module to a run mode and to a non-run mode.

9. The industrial automation device of claim 1, wherein the one or more operational mechanisms comprise an interrupt mechanism configured to enable the connected plug-in I/O module to interrupt operation of the industrial automation device.

10. The industrial automation device of claim 9, wherein the interrupt mechanism is configured to receive interrupt data from the connected plug-in I/O module and to store the interrupt data in designated registers of the interface.

11. The industrial automation device of claim 1, wherein the plurality of different types of plug-in I/O modules comprise at least one of a communication module, an analog module, and a digital module.

12. The industrial automation device of claim 1, wherein the port comprises a 40-pin connector configured to transmit data over an Asynchronous Parallel Interface.

13. Non-transitory computer-readable storage media comprising instructions for:

detecting connection of different types of plug-in input/output (I/O) modules to an industrial automation device;

retrieving plug-in I/O module configuration data for the different types of plug-in I/O modules and writing the plug-in I/O module configuration data to the different types of plug-in I/O modules;

requesting a plug-in I/O module number of inputs and a plug-in I/O module number of outputs from the different types of plug-in I/O modules and storing the plug-in I/O module number of inputs and the plug-in I/O module number of outputs in designated registers; and requesting feature data from the different types of plug-in I/O modules and storing the feature data in additional designated registers, wherein the feature data comprises input latch mechanism data, output latch mechanism data, or user interrupt functionality data, or a combination thereof.

14. The non-transitory computer-readable storage media of claim 13, comprising instructions for retrieving identification data from the different types of plug-in I/O modules.

15. The non-transitory computer-readable storage media of claim 13, comprising instructions for setting the different types of plug-in I/O modules to a run mode and to a non-run mode.

16. The non-transitory computer-readable storage media of claim 13, comprising instructions for transmitting controller mode data to the different types of plug-in I/O modules, wherein the controller mode data comprises error data, run data, or power data, or a combination thereof.

17. An industrial automation control and monitoring system, comprising:

an industrial automation device configured to control and/or monitor a process;

a plug-in input/output (I/O) module connected to the industrial automation device through a port of the industrial automation device designed to receive different types of plug-in I/O modules; and an interface of the industrial automation device for enabling communication between the industrial automation device and the plug-in I/O module, wherein the interface comprises:

a module identification mechanism configured to detect which of the different types of plug-in I/O modules is connected to the interface through the port;

a module I/O mechanism configured to request a number of inputs and a number of outputs from the plug-in I/O module and configured to store the number of inputs and the number of outputs from the plug-in I/O module in designated registers of the interface; and a module feature mechanism configured to request feature data from the different types of plug-in I/O modules and storing the feature data in additional designated registers of the interface, wherein the feature data comprises input latch mechanism data, output latch mechanism data, user interrupt functionality data, or a combination thereof.

18. The industrial automation control and monitoring system of claim 17, wherein the plug-in I/O module comprises a control device configured to control operation of the plug-in I/O module, and wherein the control device comprises plug-in I/O module registers configured to store input data and output data for the plug-in I/O module.

19. The industrial automation control and monitoring system of claim 18, wherein the interface is configured to store the input data and the output data in the additional designated registers of the interface that correspond to the plug-in I/O module registers.

20. The industrial automation control and monitoring system of claim 17, wherein the plug-in I/O module comprises storage containing identification data for the plug-in I/O module, and wherein the module identification mechanism is configured to retrieve the identification data from the plug-in I/O module upon power up of the industrial automation device.

* * * * *